No. 833,915. PATENTED OCT. 23, 1906.
C. F. BRANDT.
LACING CATCH OR HOOK.
APPLICATION FILED FEB. 13, 1906.
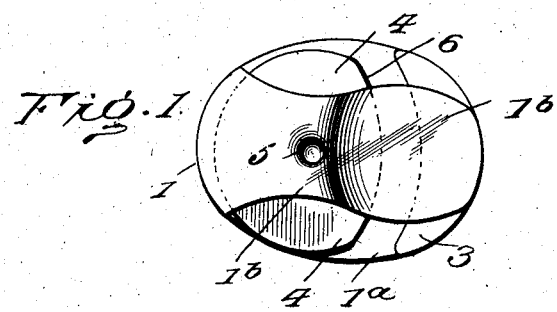
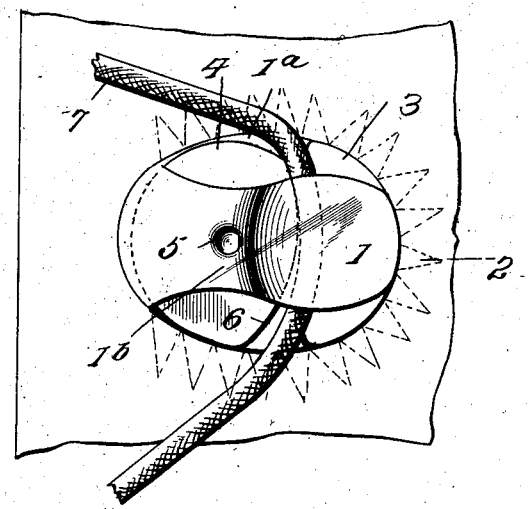
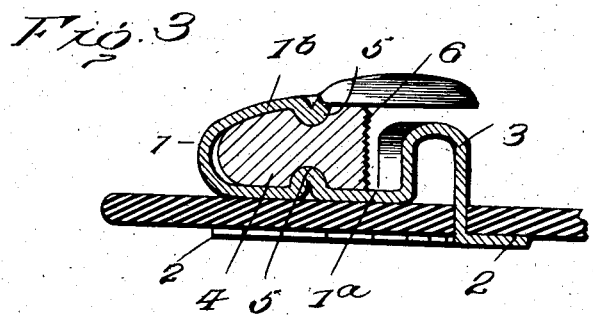
Inventor
C. F. Brandt

UNITED STATES PATENT OFFICE.

CHARLES F. BRANDT, OF NEW CASTLE, PENNSYLVANIA.

LACING CATCH OR HOOK.

No. 833,915.  Specification of Letters Patent.  Patented Oct. 23, 1906.

Application filed February 13, 1906. Serial No. 300,891.

*To all whom it may concern:*

Be it known that I, CHARLES F. BRANDT, a citizen of the United States, residing at New Castle, in the county of Lawrence and State of Pennsylvania, have invented certain new and useful Improvements in Lacing Catches or Hooks, of which the following is a specification.

This invention consists of a novel form of lacing-catch for shoes, gloves, or the like, and adapted to form a positive means to engage the end portions of a lacing to prevent the same from becoming loose or untied.

For a full description of the invention and the merits thereof and also to acquire a knowledge of the details of construction of the means for effecting the result reference is to be had to the following description and accompanying drawings, in which—

Figure 1 is a top plan view of a device embodying the invention, lacing detached. Fig. 2 is a top plan view, lacing in position. Fig. 3 is a vertical cross-section.

Corresponding and like parts are referred to in the following description and indicated in all the views of the drawings by the same reference characters.

In the practical embodiment of the invention it is designed to use a lacing-hook 1, which is of a form somewhat similar to those which are commonly applied to shoes, said hook being formed of sheet metal and having small prongs or points 2 adapted to pass through the leather or material to which the hook is applied to secure the device thereto in the customary way. The base 1ᵃ of the hook 1, however, is bent upwardly near the mouth of the hook to form a side portion 3, which partially closes the mouth of the member 1 and is of peculiar advantage, as will now be pointed out. The side portion 3 of the hook virtually constitutes a rib pressed upwardly from the base thereof and is curved in its length so as to coöperate with a catch member 4, pivoted within or beneath the top 1ᵇ of the member 1. It is preferred that the catch member 4 be provided in its upper and lower sides with depressions in which pivot-lugs 5, pressed from the respective top and basal portions of the hook 1, are received to afford the desired pivotal mounting of the catch member aforesaid.

The catch member 4 is formed near its outermost edge with a curved cam-surface 6, which is preferably roughened and which is located adjacent to the side 3 of the hook. The lacing shown at 7 is adapted to enter the mouth of the hook and to be disposed between the side 3 and the cam-surface 6 of the catch member 4, the natural tendency of the lacing when under strain being such as to positively cause the cam-surface 6 to engage therewith, whereby it will be clamped between this surface and the side portion 3 and prevented from becoming loose.

The hooks 1 will be located, preferably, at the top portions of the upper of the shoe, and two of these hooks, with the catch members 4, will be sufficient to prevent the lacing from becoming loose, in a manner which will be evident, the strain on the lacing not being received by the knot which may be tied, but by the cam members 4. By pulling up on the ends of the lacing the catch member 4 will be moved so as to readily release said ends and permit the lacing to be loosed preparatory to the removal of the part to which it is applied.

Having thus described the invention, what is claimed as new is—

As a new article of manufacture, a lacing-hook consisting of top and basal portions, the basal portion being formed with prongs at its edge portions to attach the same to a suitable part, a catch arranged between the top and basal portions of the hook and provided with depressions in its upper and lower sides and having a curved roughened cam-surface, the top and basal portions of the hook being pressed to form pivot elements entering the depressions in the catch to pivotally connect the latter with the hook, the mouth of the hook being partially closed by an integral rib pressed upwardly from the basal portion of said hook, said rib being curved to conform with the curvature of the roughened cam-surface of the catch.

In testimony whereof I affix my signature in presence of two witnesses.

CHARLES F. BRANDT. [L. S.]

Witnesses:
W. H. FALES,
E. M. UNDERWOOD.